Aug. 18, 1953          J. N. CORRY          2,649,010

INSTRUMENT FOR MEASURING SPEED OF SHAFTS, AND THE LIKE

Filed Sept. 14, 1948          2 Sheets—Sheet 1

INVENTOR
J. N. CORRY
By: Fetherstonhaugh & Co.
ATT'YS

Aug. 18, 1953   J. N. CORRY   2,649,010
INSTRUMENT FOR MEASURING SPEED OF SHAFTS, AND THE LIKE
Filed Sept. 14, 1948   2 Sheets-Sheet 2

INVENTOR
J. N. CORRY
BY: Fetherstonhaugh & Co.
ATT'YS

Patented Aug. 18, 1953

2,649,010

UNITED STATES PATENT OFFICE 2,649,010

INSTRUMENT FOR MEASURING SPEED OF SHAFTS AND THE LIKE

John Nielson Corry, Toronto, Ontario, Canada

Application September 14, 1948, Serial No. 49,169

2 Claims. (Cl. 88—14)

This invention relates to a device for measuring the speed of revolution of shafts and the like.

A great demand exists for a revolution counter which can be sold at a low price.

The device of my invention is designed to meet this demand, and in order to accomplish this objective I have made use of a mode of measurement which I believe to be new in the field of revolution indicators. The mode of measurement which I employ is that of a freely mounted shaft carrying a flywheel which is given a speed of rotation which is related to the speed of rotation which is to be measured. The shaft is then halted and the stored energy of the fly-wheel is expended against the action of a spring. It will be apparent that the kinetic energy of the wheel will vary as the square of its angular velocity since its mass is constant. Evidently, it is only necessary to measure the effect upon the spring of the kinetic energy expended by the flywheel. This effect, then, is measured. I prefer to make this measurement so as to obtain directly a figure representing revolutions per unit time.

In addition to the provision of a low priced device for measuring speed of revolution, it is a further object of the invention to provide a device which may be used to measure the speed of shafts and the like without the necessity of bringing the device into direct contact with the shaft in question.

It is a further object of the invention to provide a device which gives a direct reading or which gives a reading which need only be multiplied by a simple number to obtain the revolutions per unit time.

With these and other objects in view, my invention generally comprises a frame, a shaft freely mounted in said frame, a fly-wheel rigidly mounted upon said shaft, means for bringing said shaft up to the desired speed, means for halting said shaft, a spring mounted so as to be distorted by the energy stored in said fly-wheel at the time said shaft is halted, and an indicating means designed to record the degree of distortion of said spring.

It will be readily apparent that the invention could be applied in a number of ways and a number of different apparatuses could be devised to carry out my invention. For example, if a compression spring were employed in a device according to the invention, then the apparatus would vary considerably from that employed when a torsion spring is used.

In order to illustrate my invention, I intend to describe in detail, and show drawings of, one device in accordance with my invention. I have chosen to illustrate the case when a torsion spring is employed. However, I do not intend that the invention should be limited to this one device since it is merely being shown as one example of how the invention may be applied.

Figure 1:
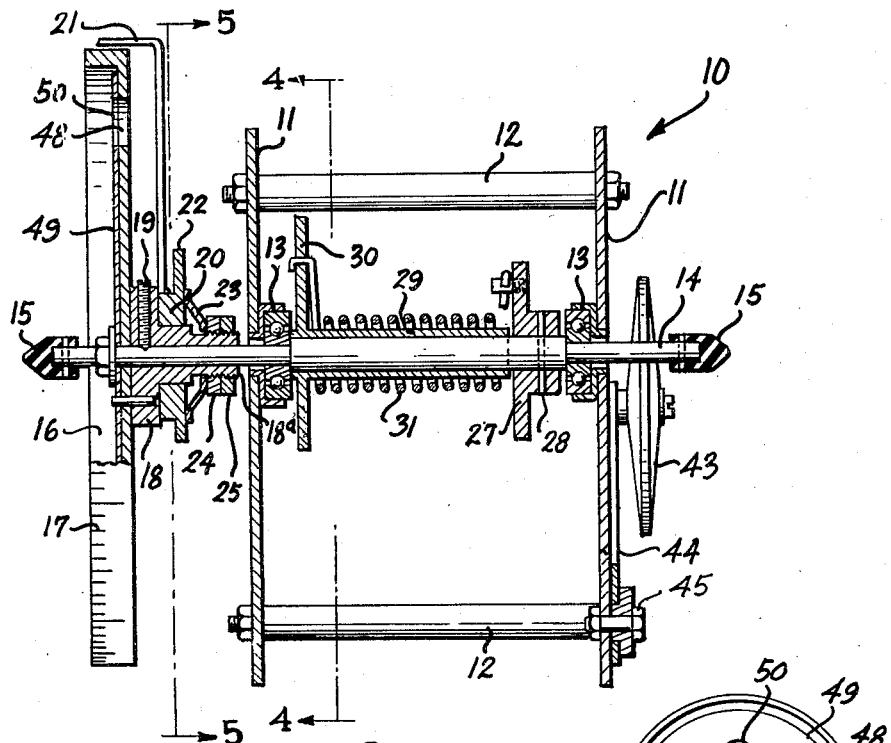
Figure 1 is a sectional view of the device taken through the centre thereof.
Figure 3:
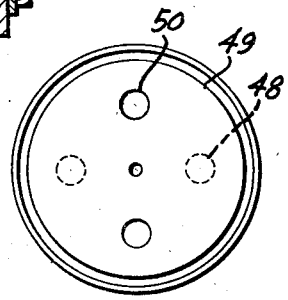
Figure 3 shows a stroboscopic disc mounted on the fly-wheel. (The remainder of the device is not shown.) This disc is used, as in the case of the means shown in Figure 2, when direct contact with the shaft of unknown speed is not being used.
Figure 2:
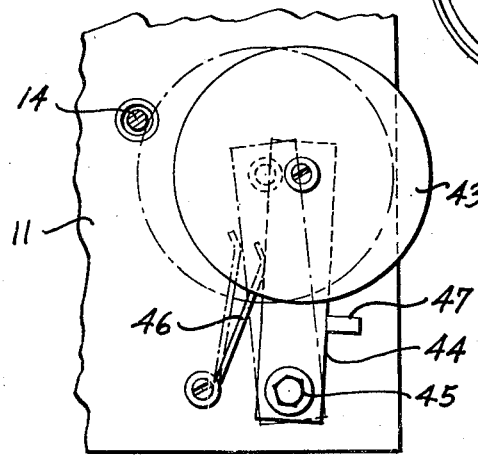
Figure 2 shows a means for turning the shaft when direct contact with the shaft of unknown speed is not being used.
Figure 4:
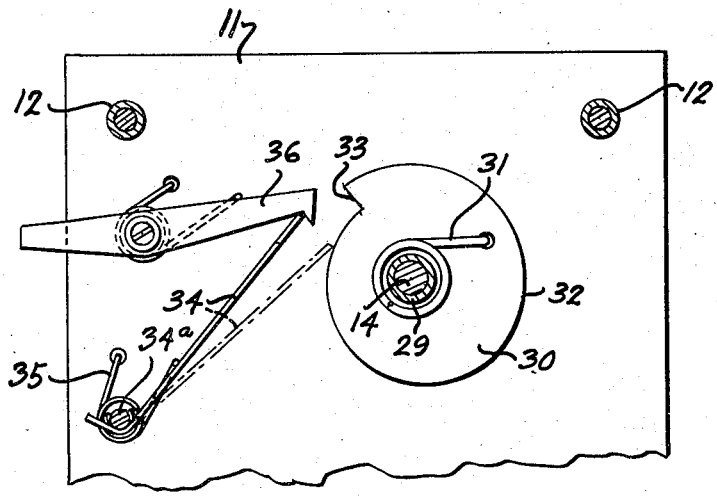
Figure 4 is a fragmentary view of a means for halting rotation of the shaft, taken along the line 4—4 of Figure 1.
Figure 5:
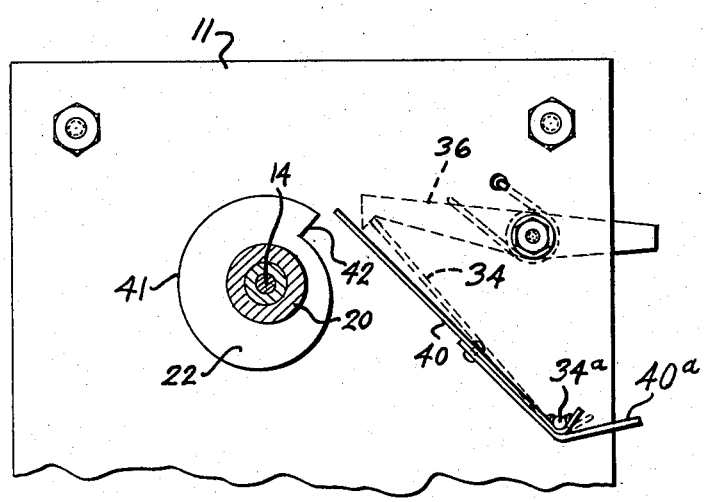
Figure 5 is a fragmentary view of a means for moving the indicating arm relative to the flywheel during the halting of the shaft, taken along the line 5—5 of Figure 1.

Throughout the several figures, like reference numerals refer to like parts. In the embodiment of the invention illustrated in the drawings, reference numeral 10 indicates a frame for the instrument made up of rectangular end pieces 11 joined by cross members 12.

An anti-friction bearing, preferably in the form of a ball bearing assembly 13, is mounted in an orifice in each end piece 11. A shaft 14 is mounted by ball bearing assemblies 13 so as to be freely rotatable relative to frame 10. Each end of shaft 14 projects beyond end pieces 11. Each end of shaft 14 is provided with a rubber tip 15. Rigidly secured to shaft 14 exteriorly of frame 10, is a fly-wheel 16. The periphery of fly-wheel 16 is provided with a scale 17. A hub 18 is mounted on shaft 14 rearwardly of fly-wheel 16. Hub 18 has a projecting portion 18a extending rearwardly thereof. A set screw 19 secures hub 18 upon shaft 14. A second hub 20 is rotatably mounted upon part of the projecting portion 18a of hub 18. Hub 20 carries a rigidly connected indicating arm 21 and a disc cam 22. A spring element 23, which is preferably made of Phosphor bronze, is freely mounted upon projecting portion 18a of hub member 18. Portions of spring member 23 are in frictional contact with disc cam 22. The end of the projecting portion 18a is externally screw threaded and an adjusting nut 24 is mounted upon this thread, said nut being provided to vary the amount of frictional contact between spring element 23 and disc cam 22. Adjusting nut 24 is locked in position by means of a lock nut 25.

Rigidly mounted upon shaft 14, between end pieces 11, is a hub 27 which is fixed to shaft 14 by means of a pin 28. Freely mounted upon shaft 14 between one end piece 11 and hub 27 is a sleeve 29 carrying a disc cam 30. A torsion spring 31 is concentrically wound upon sleeve 29, one end of said spring being connected to disc cam 30, the other end of said spring being connected to hub 27. Disc cam 30 is provided with a rise 32 and a drop 33. An arm 34 is rigidly mounted upon a shaft 34a, and shaft 34a is rotatably mounted by the end pieces 11. A spring 35 is operatively connected with arm 34, tending to cause arm 34 to rotate downwardly. A spring loaded trigger release mechanism 36 is mounted upon end piece 11 and is adapted to hold arm 34 out of contact with disc cam 30. When, however, trigger release mechanism 36 is tripped, arm 34 rotates downwardly and bears against disc cam 30. Arm 34 may be employed to stop rotation of disc cam 30 due to the entrance of arm 34 in the drop 33 in the said disc cam. This operation will be effective only when disc cam 30 is rotating in one predetermined direction, which direction will be determined by the manner in which rise 32 and drop 33 are struck in disc cam 30.

When shaft 14 is rotating in a direction in which arm 34 is effective in halting disc cam 30, then the application of arm 34 so as to engage drop 33 will not only halt disc cam 30 but will also, in time, halt shaft 14. Shaft 14 will be halted since torsion spring 31 is connected both to disc cam 30 and hub 27 which is secured to shaft 14. Therefore, rotation of shaft 14 after application of arm 34 in drop 33 is only possible against the action of torsion spring 31, and such action will necessarily cause temporary distortion of spring 31.

The projecting end of shaft 34a (on the flywheel side of end piece 11) carries an arm 40 of resilient material such as spring steel. A member 40a is attached to substantially the midpoint of arm 40. Disc cam 22 is provided with a rise 41 and a drop 42. Arm 40 is designed to cooperate with drop 42 and check the rotation of disc cam 22 contemporaneously with the stoppage of disc cam 30 by means of arm 34. Since indicating arm 21 is carried by the hub 20 (which also carries disc cam 22) the stoppage of disc cam 22 causes relative movement to take place between halted indicator arm 21 and scale 17 on fly-wheel 16. This movement takes place despite the frictional contact of hub 20 and hub 18 (which contact is brought about by the pressure of spring element 23). When torsion spring 31 has caused the fly-wheel to cease to rotate in one direction, the fly wheel will then rotate in the opposite direction, but, during this second-mentioned rotation, indicator arm 21 will not change position relative to scale 17, due to the frictional contact imposed by spring element 23 between hubs 18 and 20. Arm 40 and drop 42 act to overcome this frictional contact only when disc cam 22 is rotating in one predetermined direction, which direction is the same as that in which arm 34 operates to halt disc cam 30. When it is desired to return indicating arm 21 to the zero position on scale 17, arm 34 is rotated upwardly so as to be held by trigger release mechanism 36. Member 40a is then pressed upwardly causing arm 40 to flex downwardly, whereby arm 40 engages drop 42 in disc cam 22. Shaft 14 is then rotated until indicating arm 21 is at the zero position on scale 17.

When it is desired to get shaft 14 rotating at the same speed as the shaft of unknown speed, this may be simply done by pressing either of the rubber tips 15 against the end of the shaft of unknown speed. Since the device can only be stopped by means of arm 34 when it is rotating in one predetermined direction, then the rubber tip 15 must be chosen which will give the desired predetermined direction of rotation to shaft 14.

When it is desired to obtain a reading of revolutions per unit time of a shaft or the like, and it is either impossible or difficult to place the instrument directly against the shaft, I employ the stroboscopic principle to relate the speed of shaft 14 with the speed of the unknown shaft. A wheel 43, preferably made of rubber or like material is rotatably mounted upon an arm 44 which is pivotally mounted upon end piece 11 as shown at 45. A spring member 46, also mounted upon end piece 11, normally holds arm 44, carrying wheel 43, away from shaft 14. A stop 47 limits the distance which spring 46 holds wheel 43 away from shaft 14. Wheel 43 may be rotated with the palm of the hand and pressed inwardly so as to frictionally engage shaft 14 and rotate the latter. Wheel 43 is of much greater diameter than shaft 14. It is, therefore, possible to rotate and press inwardly wheel 43 and thus impart the desired speed to shaft 14.

Fly-wheel 16 is provided with a number of orifices 48 and a cardboard disc 49 having orifices 50 therein is mounted upon fly-wheel 16. Disc 49 is so located on fly-wheel 16 that vision is permitted through at least one of the orifices 48, due to the fact that at least one orifice 50 overlies one orifice 48. The end of the shaft of unknown speed is provided with suitable markings. These markings are then sighted through the exposed orifices in fly wheel 16. In operation, the speed of fly wheel 16 is brought up to a speed slightly in excess of that speed of the observed shaft at which the markings on the latter appear to be stationary, and is then allowed to slow down until the markings appear stationary. A revolutions per unit time reading is then taken with the device of my invention. The speed of the shaft under observation may then be found by application of the following formula:

Indicated revolutions per unit time multiplied by the number of exposed orifices in the fly-wheel and divided by the number of images. By number of images I means the number of times a single marking on the shaft under observation is seen through all the exposed orifices in the fly-wheel of the "adjusted to speed" shaft 14.

To take a reading of revolutions per unit time with the device of my invention, it is only necessary to bring the shaft up to the desired speed in either of the fashions indicated above. Then arm 34 is released by the tripping of trigger release mechanism 36. Arm 34 enters rise 33 in disc cam 30 and disc cam 30 is halted. Meanwhile, the stored energy of fly-wheel 16 causes it to continue to rotate against the action of torsion spring 31. During this rotation of the fly-wheel, indicating arm 21 is given a movement relative to the scale 17. When maximum distortion occurs, the fly-wheel changes its direction of rotation and may be allowed to come to a halt or may be halted. A reading is then taken upon scale 17 at the point indicated by the indicating arm 21. Indicating arm 21 is then returned to the zero position.

Modifications of this invention will be apparent to those skilled in the mechanical arts and in the art of instrument making. It is, therefore, intended that the scope of this invention should be limited only by the nature of the subjoined claims.

What I claim as my invention is:

1. A device for measuring the speed of shafts and the like comprising a frame, anti-friction bearings mounted on said frame, a shaft mounted in said anti-friction bearings, said shaft having each of its ends projecting outwardly from said frame, a fly-wheel rigidly mounted upon said shaft exteriorly of said frame, means for rotating said shaft, a hub rigidly secured to said shaft, a sleeve carrying a disc cam freely mounted upon said shaft, a torsion spring substantially concentrically mounted upon said shaft, one end of said spring being secured to said hub, the other end of said spring being secured to said disc cam, an arm mounted upon said frame and adapted to cooperate with said disc cam so as to halt the latter, said arm being normally held out of engagement with said disc cam by means of a trigger release mechanism, said arm being releasable by tripping of said trigger release mechanism so as to engage said disc cam, and indicating means designed to measure the maximum amount of distortion imparted to said spring after tripping of said trigger release mechanism.

2. A device for measuring the speed of shafts and the like as described in claim 1 in which said means for rotating said shaft comprises a wheel rotatably mounted upon an arm, said arm being pivotally mounted on said frame, and in which a plurality of orifices are disposed in said fly-wheel in order that the latter may be employed to stroboscopically establish a relationship between the speed of said shaft and the speed of the shaft being observed.

JOHN NIELSON CORRY.

References Cited in the file of this patent

UNITED STATES PATENTS

| Number | Name | Date |
| --- | --- | --- |
| 1,024,183 | Clinker | Apr. 23, 1912 |
| 2,022,666 | Haskell | Dec. 3, 1935 |
| 2,177,876 | Perrey | Oct. 31, 1939 |
| 2,193,646 | Rich | Mar. 12, 1940 |
| 2,342,141 | Hansen | Feb. 22, 1944 |
| 2,427,796 | Macdonald | Sept. 23, 1947 |